United States Patent [19]

Lee

[11] 4,423,111
[45] Dec. 27, 1983

[54] POLYETHERIMIDE RESIN AND ELECTRICAL CONDUCTORS INSULATED THEREWITH

[75] Inventor: Yue-Guey L. Lee, Schenectady, N.Y.

[73] Assignee: General Electric Company, Schenectady, N.Y.

[21] Appl. No.: 246,046

[22] Filed: Mar. 20, 1981

Related U.S. Application Data

[63] Continuation-in-part of Ser. No. 137,991, Apr. 7, 1980, abandoned.

[51] Int. Cl.³ .................. C08G 18/30; B32B 27/00; D02G 3/00
[52] U.S. Cl. .................................. 428/383; 528/48; 528/52; 528/73; 528/185; 428/458; 428/473.5
[58] Field of Search ............... 528/73, 52, 48, 73, 528/185; 428/383

[56] References Cited

U.S. PATENT DOCUMENTS

| | | | |
|---|---|---|---|
| 3,541,038 | 11/1970 | Nakano et al. | 260/30.6 |
| 3,817,926 | 6/1974 | Pauze et al. | 260/65 |
| 3,847,867 | 11/1974 | Heath et al. | 260/47 CP |
| 4,098,800 | 7/1978 | Banucci et al. | 260/346.3 |
| 4,196,277 | 4/1980 | Jones et al. | 528/208 |
| 4,197,396 | 4/1980 | Banucci et al. | 528/208 |
| 4,215,157 | 7/1980 | Boldebuck et al. | 427/116 |
| 4,221,897 | 9/1980 | Takekoshi | 528/125 |
| 4,281,100 | 7/1981 | Takekoshi | 528/188 |
| 4,296,229 | 10/1981 | Pauze et al. | 428/383 |
| 4,354,965 | 10/1982 | Lee et al. | 528/52 |

*Primary Examiner*—H. S. Cockeram
*Attorney, Agent, or Firm*—Hedman, Casella, Gibson, Costigan

[57] ABSTRACT

Novel high molecular weight resins, useful for electrically insulating conductors, are prepared by polycondensation of a dianhydride, or a mixture of two or more dianhydrides, and a diisocyanate in an inert organic solvent, preferably in the presence of a catalytic amount of 2-methylimidazole.

7 Claims, 1 Drawing Figure

10
11
12 POLYETHERIMIDE OF BISPHENOL-A DIANHYDRIDE AND DIISOCYANATE

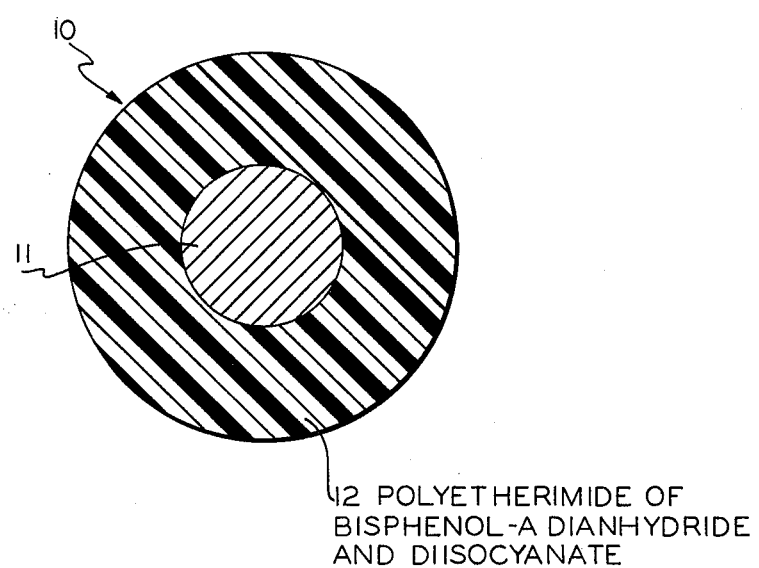

POLYETHERIMIDE RESIN AND ELECTRICAL CONDUCTORS INSULATED THEREWITH

The present application is a continuation-in-part of copending application Ser. No. 137,991 by the same inventor, filed Apr. 7, 1980, now abandoned.

The present invention relates to polyetherimide resins and to electrical conductors coated therewith. More particularly it relates to polyetherimides derived from a dianhydride of a diphenolic compound (or a mixture thereof with a least one other dianhydride) and a diisocyanate.

BACKGROUND OF THE INVENTION

Polyetherimides comprising the reaction products of a dianhydride of a diphenolic compound and a diamine, e.g., methylene dianiline, are known to form useful resinous coatings for electrical conductors. See, for example, Heath and Wirth, U.S. Pat. No. 3,847,867. Furthermore, polyamideimides comprising the reaction products of a carboxylic acid anhydride, a diamine and a diisocyanate are known to form useful coatings for electrical conductors. See, for example, Pauze and Holub, U.S. Pat. No. 3,817,926. In addition, polyimideamide resins comprising the reaction products of a tribasic acid anhydride and a diisocyanate are known to form useful insulating coatings, see, e.g., Nakano and Koyama, U.S. Pat. No. 3,541,038. The disclosures of the foregoing patents are incorporated herein by reference.

It has now been discovered that uniquely useful reaction products comprising polyetherimide resins can be formed from the reaction of a dianhydride of a diphenolic compound, or a mixture thereof with at least one other dianhydride, and a diisocyanate. Such products are preferred for use as insulating coatings for electrical conductors, e.g., magnet wire and magnet strip, because they are safer, better and more economical. The resins are preferably applied as compositions diluted in an organic solvent.

DESCRIPTION OF THE INVENTION

According to the present invention there are provided high molecular weight polyetherimide resins prepared by subjecting a dianhydride of the formula

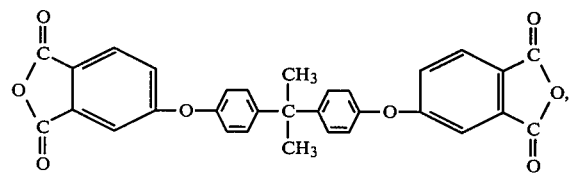

or a mixture thereof with at least one other dianhydride of a tetracarboxylic acid, and 0.99 to 1.01 moles, per mole of the dianhydride(s), of an organic diisocyanate compound of the formula

O=C=N—R—N=C=O wherein R is Divalent alkylene radical of 2 to 20 carbon atoms,

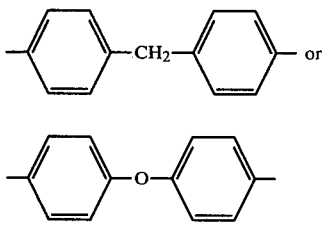

to polycondensation at a temperature of about 60° to 200° C. in the presence of an inert solvent.

It is also contemplated to provide electrical conductors having an insulating coating thereon comprising a resin as above defined.

In addition, there are contemplated coating compositions comprising a polyetherimide resin dissolved in an organic solvent, the polyetherimide resin being as above defined.

In preferred features, the resin will be prepared in the presence of a catalytic amount, preferably from a trace to about 10 mole percent (based on the dianhydride component) of 2-methylimidazole. Preferably, the organic diisocyanate will be diphenylmethanediisocyanate.

The dianhydride component, 2,2-bis[4-(3,4-dicarboxyphenoxy)phenyl]propane dianhydride, also known as bisphenol-A dianhydride, is described in the above-mentioned Heath and Wirth, U.S. Pat. No. 3,847,867, and can be made by hydrolyzing, followed by dehydrating, the reaction product of a nitro-substituted phenyl dinitrile with a metal salt of a dihydric aryl compound in the presence of a dipolar aprotic solvent.

Also contemplated is the substitution of part of the bisphenol-A dianhydride with one or more dianhydrides of tetracarboxylic acids. Suitable substituent dianhydrides may be either aromatic dianhydrides or aliphatic dianhydrides, as follows:

The aromatic dianhydrides that are useful in this invention are those having the formula:

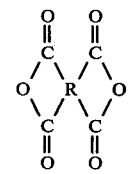

wherein R is a tetravalent radical containing at least one ring of 6 carbon atoms and having benzenoid unsaturation, each pair of carboxyl groups being attached to a different adjacent carbon atoms. These dianhydrides include, for example,
pyromellitic dianhydride,
2,3,6,7-naphthalenetetracarboxylic dianhydride,
3,3',4,4'-benzophenonetetracarboxylic dianhydride,
benzene-1,2,3,4-tetracarboxylic dianhydride,
bis (3,4-dicarboxyphenyl) sulfone dianhydride,
bis (2,3-dicarboxyphenyl) methane dianhydride,
2,6-dichloronapthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride, naphthalene-1,4,5,8-tetracarboxylic dianhydride,
naphthalene-1,4,5,8-tetracarboxylic dianhydride,
naphthalene-1,2,4,5-tetracarboxylic dianhydride,
3,3′,4,4′-diphenyltetracarboxylic dianhydride,
1,2,5,6-naphthalenetetracarboxylic dianhydride,
2,2′2,2′-diphenyltetracarboxylic dianhydride,
2,2-bis (3,4-dicarboxyphenyl) propane dianhydride,
3,4,9,10-phenylenetetracarboxylic dianhydride,
bis (3,4-dicarboxyphenyl) ether dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride, and the like.

The aliphatic dianhydrides that are useful in this invention are those having the formula:

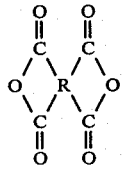

where R' is a straight-chain or alicyclic tetravalent radical having from 1 to 10 carbon atoms. These dianhydrides include, for example:
methanetetracarboxylic dianhydride,
ethanetetracarboxylic dianhydride,
propanetetracarboxylic dianhydride,
butanetetracarboxylic dianhydride,
hexanetetracarboxylic dianhydride,
cyclohexanetetracarboxylic dianhydride, and the like.

The organic diisocyanates can be prepared in ways known to those skilled in this art, and they are also commercially available.

The polymer is prepared from the reaction of bisphenol-A dianhydride (BPA-DA) and diphenylmethanediisocyanate (MDI) or diphenyletherdiisocyanate in the presence or absence of 2-methylimidazole (2-MeIM) catalyst, in an organic solvent, such as N-methylpyrrolidone (NMP), dimethylacetamide (DMAC), an aromatic hydrocarbon, e.g., of 6 to 40 carbon atoms, e.g., xylene, or a proprietory aromatic hydrocarbon solvent, e.g., Solvesso 100, or in mixtures thereof, such as NMP-DMAC, NMP-XYLENE, NMP-DMAC-xylene- or -Solvesso 100, etc.

The preferred reaction pathway is as follows:

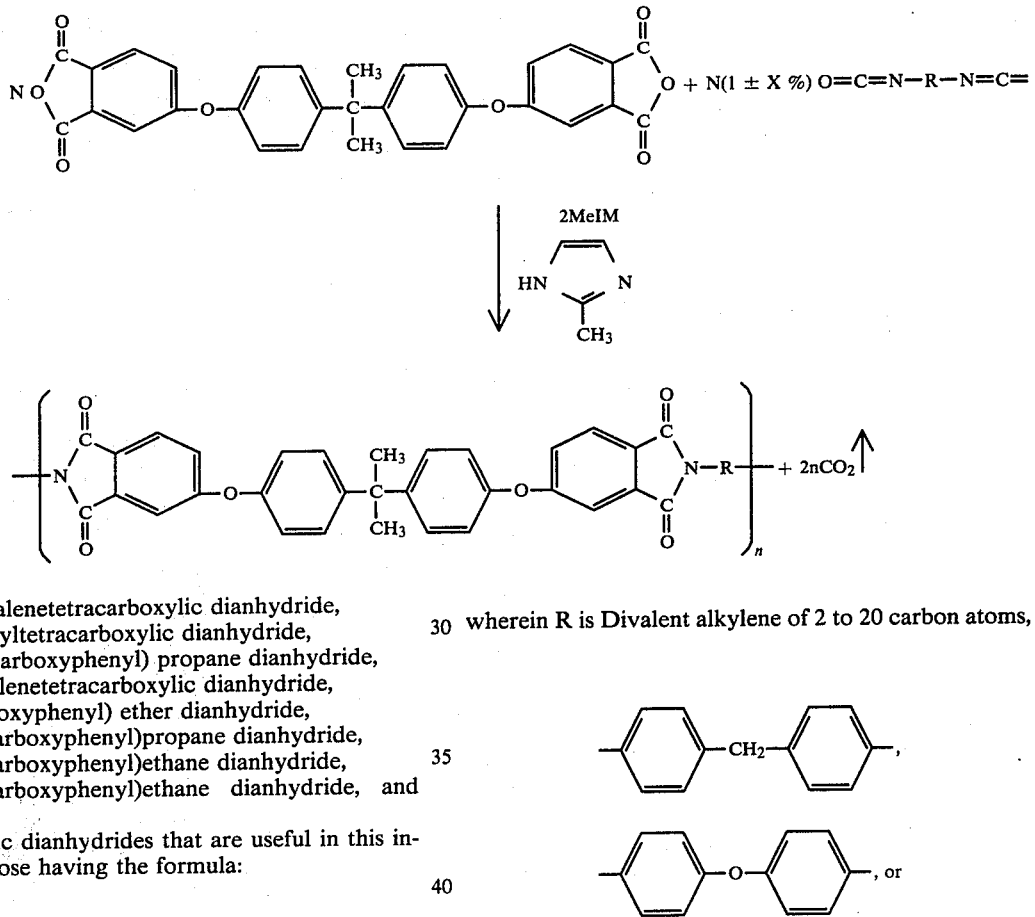

wherein R is Divalent alkylene of 2 to 20 carbon atoms,

a mixture thereof.

The optimum mole ratio of MDI (or the oxygenated analog) to BPA-DA is 0.99–1.01 to 1.00, and the catalyst is 0–10 mole %, based on dianhydride. To make a coating composition, the resin can be prepared in the organic solvent, e.g., NMP, NMP-DMAC, DMP-xylene or Solvesso 100, etc., or the resin can be isolated, then redissolved in such solvents, or in methylene chloride, dimethyl formamide, cresylic acid, phenol, and the like.

Conventional preparative methods are used. See, for example, the above-mentioned U.S. Pat. No. 3,541,038, which sets forth reaction times, temperatures, etc.

In one manner of proceeding, the BPA-DA is reacted with MDI in the presence of 2-MeIM and a mixture of 2.3:1 N-methylpyrrolidone xylene at a temperature of about 135° C. for about 24 hours. During the first period of reaction, carbon dioxide is continuously evolved. Later, the solution gradually increases in viscosity and carbon dioxide evolution substantially ceases. A suitable termination point is a viscosity of Gardner Z1 to Z2½. Such an enamel can be used as a sole coat on a wire conductor or it can be used as a top coat over a polyester or a polyesterimide base coat.

In accord with conventional practices, other additives may be formulated into the compositions, such as, without limitation, minor proportions of aliphatic amino compounds, conventional phenolic resins, titanate esters, blocked polyisocyanates, and the like.

BRIEF DESCRIPTION OF THE DRAWING

In the drawing, the FIGURE shows a section of a magnet wire made according to this invention.

DESCRIPTION OF THE PREFERRED EMBODIMENT

In the FIGURE a magnet wire indicated generally by the numeral 10 has a conductor 11 covered with a layer 12 of a resinous polyetherimide of bisphenol-A dianhydride and a diisocyanate. Although the drawing illustrates a conductor 11 that is circular in section, it will be understood that square or rectangular conductors in the form of flat strips or foils may also be used without departing from the invention.

A suitable polyetherimide for layer 12 can be made following the Examples.

EXAMPLE 1

One mole (520 g.) of 2,2-bis[4-(3,4-dicarboxyphenoxy)phenyl]propane dianhydride, 1.01 mole (252.5 g.) of diphenylmethane diisocyanate, 0.05 mole (4.1 g. of 2-methylimidazole, 838.94 g. of N-methyl pyrrolidone and 364.74 g. of xylene are added to a five liter, three-necked round bottomed flask equipped with a stirrer, thermometer, condenser and a nitrogen inlet. The mixture is heated from room temperature to 135° C. in approximately two hours and held at 135° C. for 18–22 hours until a viscosity of Z1-Z2½ is obtained. In this reaction, the solution changes from yellow, orange to clear red and clear dark red color during the first two hours of heating, and carbon dioxide is continuously evolved. Thereafter, the solution viscosity gradually increases with continued, minor evolution of $CO_2$.

The composition contains the polyetherimide resin at a 39% solids content in organic solvent, and can be used as an electrical conductor coating composition. If desired, the resin can be isolated by pouring the cooled reaction mixture into methanol to precipitate the polymer.

Although diphenylmethanediisocyanate is shown, it can be partially or completely replaced by diphenylether diisocyanate. Moreover, the catalyst can be omitted.

The composition of Example 1 is applied to 0.0403" copper wire as a sole coat in a commercial wire tower. A build of 3.1–3.3 mil. is obtained in 7 passes. The following properties are observed.

| Speed (ft./min.) | 40 | 45 | 50 |
|---|---|---|---|
| Flexibility 25+ | 1X | 1X | Fails |
| Heat Shock-20%-30'-260° C. | 1X | 1X | Fail 20% |
| Cut Through Temperature, °C. at 2000 g. | 361 | 358 | 330 |

An excellent quality smoothly coated insulated conductor is obtained at the slower two of the three coating speeds.

The composition of Example 1 is applied to 0.0403" copper wire as an overcoat over an ethylene glycol-glycerol terephthalate polyester undercoat (GE ALKANEX 9516). A final build of 2.9–3.1 mils. is obtained. The following properties are observed:

| Speed (ft./min.) | 55 | 50 | 45 | 40 | 35 |
|---|---|---|---|---|---|
| Flexibility 25+ | Fail 3X | 2X | 1X | 1X | 2X |
| Heat Shock-20%-30' -260° C. | Fail 4X | 4X | 4X | 4X | 3X |
| Cut Through Temperature, °C. at 2000 g. | 256 | 248 | 249 | 223 | 196 |

An excellent quality smoothly coated dual-insulated conductor is obtained at the slower coating speeds.

The composition of Example 1 is applied to 0.0403" copper wire as an overcoat over an ethylene glycol-tris(2-hydroxyethyl)isocyanurate terephthalate polyester undercoat (Schenectady Chemical's ISONEL 678). A final build of 2.9–3.1 mils. is obtained. The following properties are observed:

| Speed (ft./min.) | 45 | 40 |
|---|---|---|
| Flexibility 25+ | 1X | 1X |
| Heat Shock-20%-30'-260° C. | Fail 3X | Fail 3X |
| Cut through Temperature, °C. at 2000 g. | 331 | 352 |

Except for poor heat shock, a good coated conductor is obtained.

EXAMPLE 2

The general procedure of Example 1 is repeated, except that 10 mole percent of the bisphenol-A component is substituted by benzophenonetetracarboxylic dianhydride (BTDA). There are used 936 g. (1.8 moles) bisphenol-A dianhydride, 64.45 g. (0.2 mole) BTDA, 505 g. (2.02 moles) diphenymethane diisocyanate, 1278 g. N-methyl pyrrolidone (NMP), 556 g. Solvesso 100, and 16.4 g. (0.2 mole) 2-methylimidazole. At a Gardner viscosity of about Z5¼, the reaction mixture is cooled to room temperature and cut with a solvent mixture, 400 g. NMP and 174 g. Solvesso 100, then further reacted and heated until a final Gardner viscosity of Z1 is obtained. The solids content of this composition is 39.66%.

The composition of Example 2 is applied as a sole coat to a 0.0403" copper wire in a commercial wire tower to a build of 3.0–3.2 mils. The following properties are observed:

| Speed (ft./min.) | 40 | 45 | 55 |
|---|---|---|---|
| Flex. 25+ | 1X | 1X | 1X |
| Heat Shock | 1X | 2X | 1X |
| Cut Through Temp. °C. (2000 g) | 362 | 346 | 321 |

The composition of Example 2 is used as a top coat over an ISONEL 678 base. A final build of 2.9–3.1 mils is obtained. The following wire properties are observed:

| Speed (ft./min.) | 35 | 40 | 45 |
|---|---|---|---|
| Flex. 25+ | 1X | 1X | Fail 3X |
| Heat Shock | 408 | 406 | 361 |

Half the composition of Example 2 is further cut with 236.3 g. NMP and 103.7 g. Solvesso 100, brought to 135° C. and reacted until a viscosity of Gardner Z1 is obtained. The solids content is 33.11%.

This enamel is used as a sole coat on a 0.0403" copper wire, applied to a build of 2.9-3.2 mils in a commercial wire tower. The following wire properties are observed:

| Speed | 40 | 45 | 55 |
|---|---|---|---|
| Flex. 25+ | 1X | 1X | 2X |
| Cut Through | 383 | 368 | 332 |
| Heat Shock | 1X | 1X | 1X |

The composition above is applied as a top coat over an ISONEL 678 base coat to a final build of 2.9-3.1 mils. The following wire properties are observed:

| Speed | 35 | 40 | 45 |
|---|---|---|---|
| Flex. 25+ | 2X | 1X | Fail 3X |
| Cut Through | 408 | 392 | 371 |

EXAMPLE 3

The general procedure of Example 2 is repeated, except that 43.6 g. (0.2 mole) of pyromellitic dianhydride is used as a substituent dianhydride instead of the benzophenonetetracarboxylic dianhydride of Example 2. All other amounts are the same.

After a first solvent cut and further reaction as in Example 2, a composition having a Gardner viscosity of Z1 and solids content of 38.26% is obtained. The following wire properties as a sole coat and a top coat over ISONEL 678 are observed:

| | Sole Coat | | |
|---|---|---|---|
| Wire Build (mils) | 0.0403" copper 2.8-3.1 | | |
| Speed | 45 | 55 | 60 |
| Flex. 25+ | 1X | 1X | 1X |
| Cut Through | 415 | 399 | 344 |
| Heat Shock | 1X | 2X | 2X |

| | Top Coat | | |
|---|---|---|---|
| Wire Build (mils) | 0.0403" copper 2.9-3.2 | | |
| Speed | 35 | 40 | 45 |
| Flex. 25+ | 1X | 1X | 1X |
| Cut Through | 393 | 358 | 379 |
| Heat Shock | Fail 3X | 3X | 3X |

Half of the composition of Example 3 is further reacted as in Example 2 after a second solvent cut with 236.3 g. NMP and 103.7 g. Solvesso 100, until a Gardner viscosity of Z2 is obtained. The solids content of the composition is 31.64%. The following wire properties as a sole coat and a top coat over ISONEL 678 are observed:

| | Sole Coat | | |
|---|---|---|---|
| Wire Build (mils) | 0.0403" copper 2.8-3.2 | | |
| Speed | 45 | 55 | 60 |
| Flex. 25+ | 1X | 1X | 1X |
| Cut Through | 447 | 378 | 323 |
| Heat Shock | 3X | 1X | 1X |

| | Top Coat | | |
|---|---|---|---|
| Wire Build (mils) | 0.0403" copper 2.8-3.0 | | |
| Speed | 35 | 40 | 45 |
| Flex. 25+ | 1X | 1X | 1X |
| Cut Through | 399 | 381 | 379 |
| Heat Shock | Fail 3X | Fail 3X | Fail 3X |

Many variations will suggest themselves to those skilled in the art in light of the above, detailed description. All such modifications are within the full intended scope of the appended claims.

I claim:

1. An electrical conductor having an insulating resin coating thereon, said coating consisting of a base coat of a polyester or polyesterimide and an overcoat of a resin prepared by subjecting a dianhydride of the formula

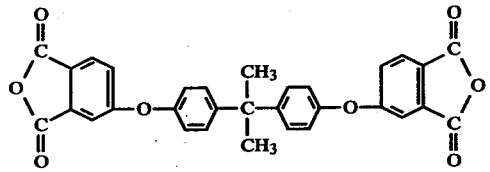

or a mixture thereof with at least one other dianhydride of a tetracarboxylic acid, and 0.99 to 1.01 moles, per mole of the dianhydride, of an organic diisocyanate compound of the formula $$O=C=N-R-N=C=O$$

wherein R is divalent alkylene radical of 2 to 20 carbon atoms,

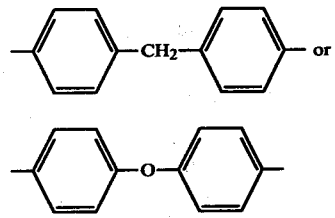

to polycondensation at a temperature of about 60° to 200° C. in the presence of an inert solvent.

2. An electrical conductor as defined in claim 1 wherein polycondensation is carried out in the presence of a catalytic amount of 2-methylimidazole.

3. An electrical conductor as defined in claim 2 wherein the amount of 2-methylimidazole comprises from trace amounts up to about 10 mole percent, based on the dianhydride.

4. An electrical conductor as defined in claim 1 wherein, in the organic diisocyanate compound, R is

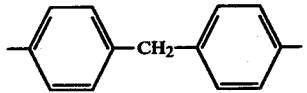

5. An electrical conductor as defined in claim 1 wherein the inert solvent comprises N-methylpyrrolidone, dimethylacetamide, an aromatic hydrocarbon, or a mixture of any of the foregoing.

6. An electrical conductor as defined in claim 1 wherein the other dianhydride is benzophenonetetracarboxylic dianhydride.

7. An electrical conductor as defined in claim 1 wherein the other dianhydride is pyromellitic dianhydride.

* * * * *